United States Patent
Moyer et al.

(10) Patent No.: US 8,042,002 B2
(45) Date of Patent: Oct. 18, 2011

(54) METHOD AND APPARATUS FOR HANDLING SHARED HARDWARE AND SOFTWARE DEBUG RESOURCE EVENTS IN A DATA PROCESSING SYSTEM

(75) Inventors: William C. Moyer, Dripping Springs, TX (US); Jimmy Gumulja, Austin, TX (US); Jeffrey W. Scott, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 470 days.

(21) Appl. No.: 12/016,664

(22) Filed: Jan. 18, 2008

(65) Prior Publication Data

US 2009/0187789 A1 Jul. 23, 2009

(51) Int. Cl.
G06F 11/00 (2006.01)
(52) U.S. Cl. .......................................... 714/35
(58) Field of Classification Search ............... 714/34, 714/35
See application file for complete search history.

(56) References Cited

U.S. PATENT DOCUMENTS

| | | | |
|---|---|---|---|
| 5,257,358 A | 10/1993 | Cohen | |
| 5,850,562 A | 12/1998 | Crump et al. | |
| 5,889,981 A * | 3/1999 | Betker et al. | 712/227 |
| 6,016,555 A * | 1/2000 | Deao et al. | 714/35 |
| 6,035,422 A * | 3/2000 | Hohl et al. | 714/35 |
| 6,321,331 B1 | 11/2001 | Roy et al. | |
| 6,356,960 B1 * | 3/2002 | Jones et al. | 710/5 |
| 6,389,557 B1 * | 5/2002 | Yu et al. | 714/34 |
| 6,553,513 B1 | 4/2003 | Swoboda et al. | |
| 6,591,378 B1 | 7/2003 | Arends et al. | |
| 6,708,270 B1 | 3/2004 | Mayer | |
| 6,862,694 B1 * | 3/2005 | Tormey et al. | 714/34 |
| 6,877,112 B1 | 4/2005 | Iino et al. | |
| 7,051,197 B2 | 5/2006 | Agarwala et al. | |
| 7,249,285 B2 * | 7/2007 | Brock et al. | 714/34 |
| 7,275,148 B2 | 9/2007 | Moyer et al. | |
| 7,334,161 B2 * | 2/2008 | Williams et al. | 714/34 |
| 7,444,504 B2 | 10/2008 | Agarwala et al. | |
| 2005/0188186 A1 * | 8/2005 | Wolczko et al. | 712/227 |

FOREIGN PATENT DOCUMENTS

WO 0248888 A2 6/2002

OTHER PUBLICATIONS

IBM "Book E: Enhanced PowerPC'™' Architecture," Version 0.99 Mar. 15, 2001.
Freescale Semiconductor, Inc. "e200z6 PowerPC'™' Core Reference Manual," 2004.

(Continued)

Primary Examiner — Joshua A Lohn
(74) Attorney, Agent, or Firm — Daniel D. Hill

(57) ABSTRACT

For some data processing systems, it is important to be able to handle overlapping debug events generated by a shared set of debug resources which are trying to cause both exception processing and debug mode entry. However, exception processing and debug mode entry generally have conflicting requirements. In one embodiment, exception priority processing is initially given to the software debug event. Normal state saving is performed and the first instruction of the debug exception handler is fetched, but not executed. Priority is then switched from the software debug event to the hardware debug event and a debug halted state is entered. Once processing of the hardware debug event has been completed, priority is returned to the software debug event and the debug exception handler is executed.

20 Claims, 3 Drawing Sheets

OTHER PUBLICATIONS

IBM; "PPC440x5 CPU Core User;s Manual"; Jul. 15, 2003; Title Pg. Copyright Pg, pp. 3-13 (Table of Contents), pp. 188 192, pp. 213-243; IBM; USA.

Zhenyu, Liu et al., "Implementation of precise exception in a 5-stage pipeline embedded processor"; Proceedings of 5th International Conference on ASIC; Oct. 21-24, 2003; pp. 447-451; IEEE.

PCT/US2008/072109; International Search Report and Written Opinion dated Mar. 5, 2009.

U.S. Appl. No. 11/750,739, Office Action—Rejection, dated Aug. 7, 2009.

U.S. Appl. No. 11/864,292, Office Action—Rejection, dated Mar. 3, 2010.

U.S. Appl. No. 11/864,292, Office Action—Final Rejection, dated Aug. 23, 2010.

Non-final Office Action dated Apr. 1, 2011 in U.S. Appl. No. 11/864,292.

Office action, non-final rejection, dated Apr. 1, 2011 in U.S. Appl. No. 11/864,292.

Office action, notice of allowance, dated Oct. 28, 2099 in U.S. Appl. No. 11/750,739.

* cited by examiner

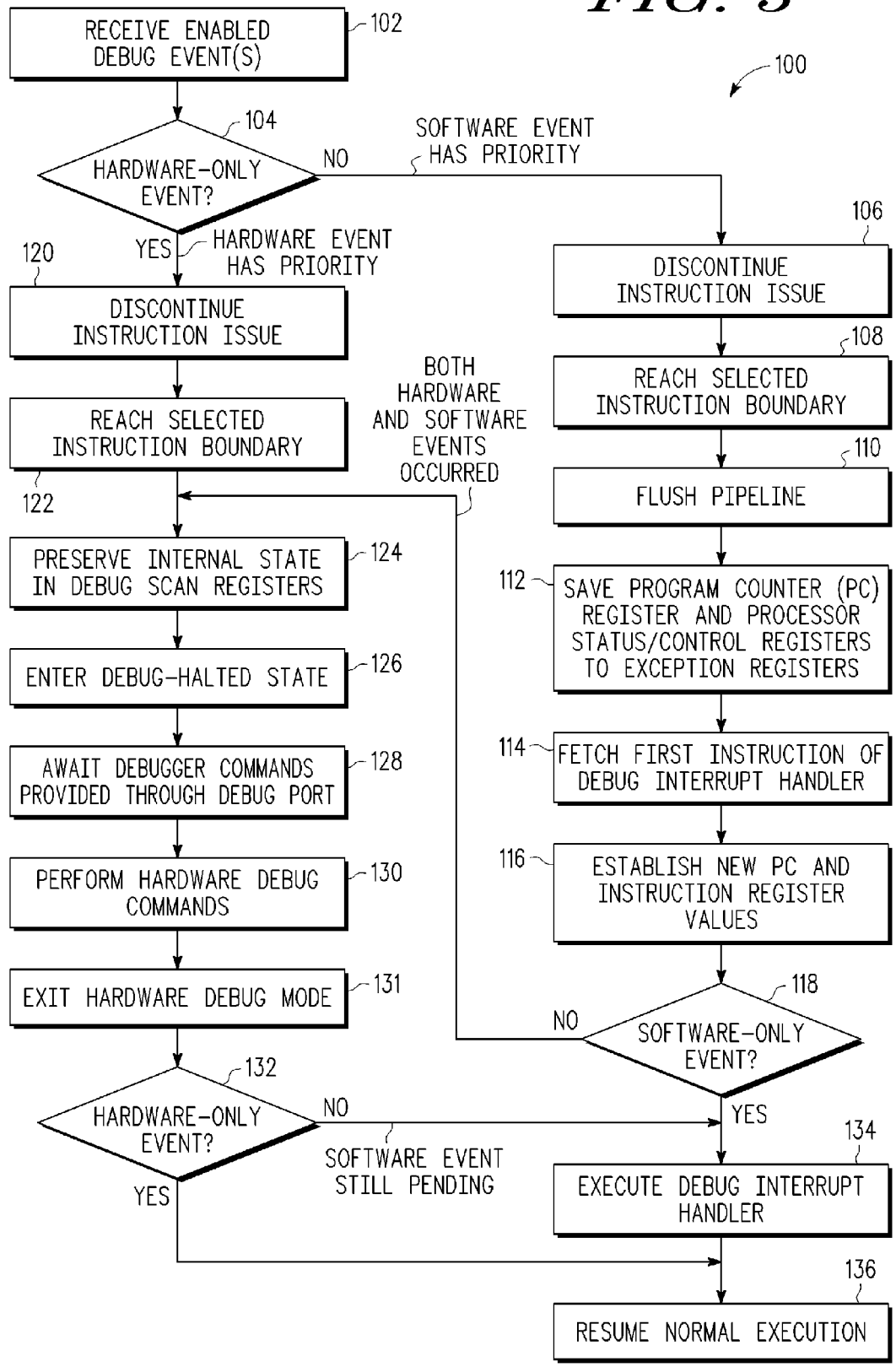

METHOD AND APPARATUS FOR HANDLING SHARED HARDWARE AND SOFTWARE DEBUG RESOURCE EVENTS IN A DATA PROCESSING SYSTEM

RELATED APPLICATION

This is related to the U.S. patent application entitled "System and Method for Monitoring Debug Events", invented by William C. Moyer, having U.S. patent application Ser. No. 11/864,292, filed Sep. 28, 2007, and assigned to the current assignee hereof.

This is related to the U.S. patent application entitled "Debugging a Processor Through a Reset Event", invented by William C. Moyer, having U.S. patent application Ser. No. 11/750,739, filed May 18, 2007, and assigned to the current assignee hereof.

BACKGROUND

1. Field

This disclosure relates generally to debugging for data processing systems, and more specifically, to handling shared hardware and software debug resource events in a data processing system.

2. Related Art

For some data processing systems, it is important to be able to handle simultaneous synchronous debug events generated by a shared set of debug resources which are trying to cause both exception processing and debug mode entry. However, as the debug circuitry is generally not used during normal operation of the data processing system, it is important that the debug circuitry be kept as small as possible for cost and space purposes.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 3 illustrates, in flow diagram form, an exemplary method for operating a processor in a data processing system of FIG. 1 in accordance with one embodiment.

DETAILED DESCRIPTION

Figure 1:
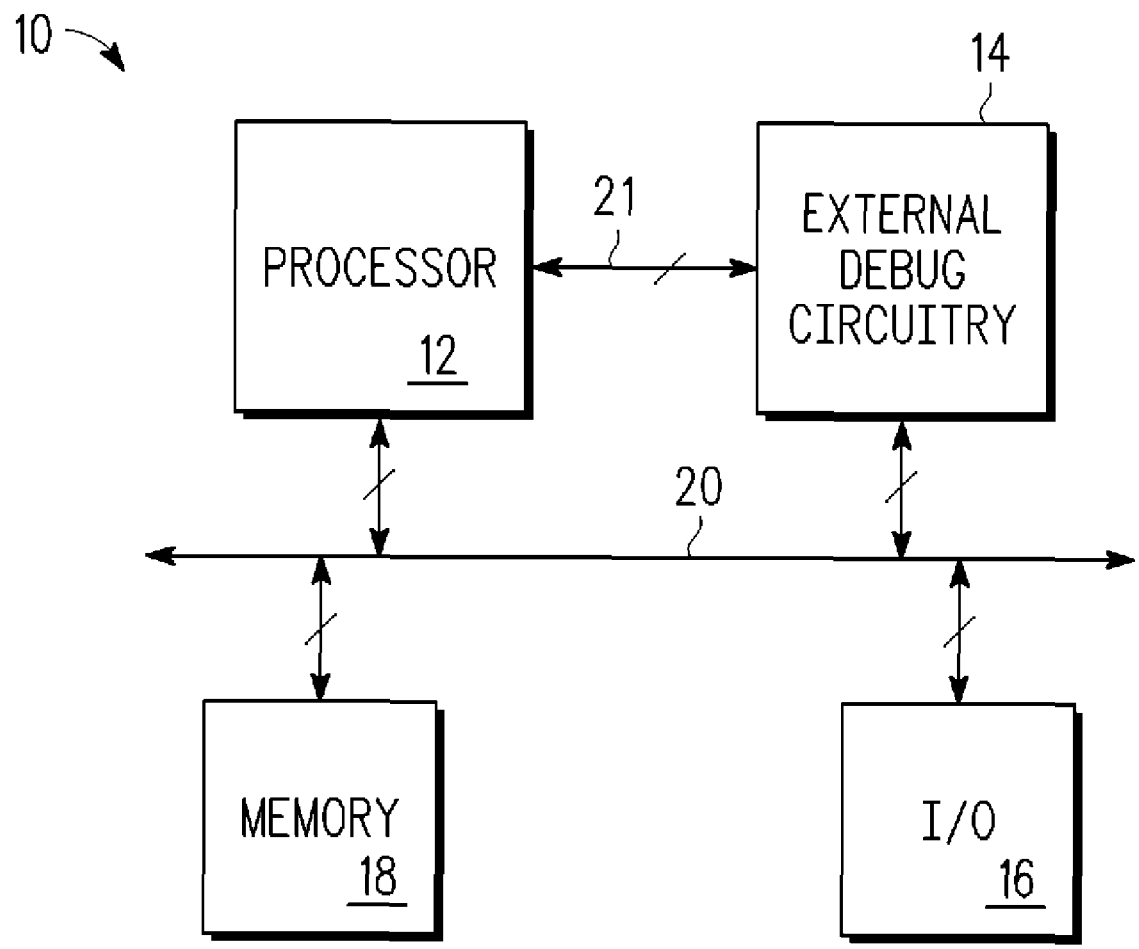
FIG. 1 illustrates, in block diagram form, a data processing system in accordance with one embodiment.

For some data processing systems, it is important to be able to handle simultaneous synchronous debug events generated by a shared set of debug resources which are trying to cause both exception processing and debug mode entry. Debug resources, including debug registers, comparator logic, and other event determining logic are one possible example of a shared resource that may be hardware-owned or software-owned, and thus may result in both the need for exception processing and the need for debug mode entry. Any other appropriate type of circuitry may also be categorized as a shared resource for debug purposes. It is important for proper debugging that the state of the processor accurately reflect each of these synchronous debug events (e.g. exception processing and debug mode entry); however, exception processing and debug mode entry generally have conflicting requirements. For example, for some data processing systems, some debug events (e.g. hardware generated debug events) result in debug mode entry or even an immediate debug-halted state, while other debug events (e.g. software generated debug events) result in exception processing which may require that the debug interrupt not be lost. However, for most data processing systems, immediate entry into debug mode generally results in a loss of any concurrently occurring software debug interrupt. A method for handling shared hardware and software debug resource events in a data processing system is thus desired. In addition, as debug circuitry is generally not used during normal operation of data processing systems, it is important that the debug circuitry be kept as small as possible for cost and space purposes. Thus the solution must solve the problem and yet require a minimum of circuitry. In addition, it would be very helpful if the solution was compatible with presently existing third party firmware.

In one embodiment, an apparatus and method are provided by which simultaneous synchronous debug events generated by both hardware-owned and software-owned resources are processed and reported. In one embodiment, the processor enters a debug mode and halts as quickly as possible to maintain preciseness of the event as defined by the processor architecture. In this embodiment, the processor also remembers that a debug interrupt has occurred, and the processor returns to process the debug interrupt event directly after exiting from the debug mode. Although extra or additional state-saving registers may be used to save state information, such extra registers would require extra circuitry and thus would incur extra cost. In fact, for some processor architectures, the number of additional state-saving registers that would be required is prohibitive.

In one embodiment, a priority scheme is used to handle simultaneous synchronous debug events generated by both hardware-owned and software-owned resources. In one priority scheme, exception priority processing is initially given to the software debug event. Normal state saving is performed (e.g. saving the program counter value and saving any necessary processor status and/or control information). The proper interrupt processing vector is formed to point to the entry point of the appropriate debug exception handler (also called a debug interrupt handler), and the first instruction of the debug exception handler is fetched, but not executed. For one priority scheme, the priority is then switched at this point from the software debug event to the hardware debug event. In one embodiment, once the hardware debug event is given priority, the processor enters a debug halted state. In one embodiment, the processor is halted at a selected boundary during instruction execution. In alternate embodiments this selected boundary may be determined in any desired manner, for example, for alternate embodiments this selected boundary may be predetermined (e.g. using one time programmable fuses), fixed (e.g. hardwired), user software programmable (e.g. by writing a bit field in a register), user hardware determined (e.g. by changing the state of one or more signals), etc.

For one embodiment, once the processor has been halted in a debug mode, the current context of the processor is saved and then any desired debug activity may be performed (e.g. execution of debug instructions). Note that by saving the state or context of the processor at this point, no changes need to be made to the firmware used by third party debuggers. In one embodiment, after hardware debugging is complete, the debug firmware restores the processor to its pre-halted processor state and the processor is released to continue executing instructions. For one embodiment, the processor resumes execution by executing the first instruction of the debug exception handler. Then once the debug exception handler has completed the handling of the software debug event, normal execution is resumed by the processor. Thus in one embodiment, concurrent debug events which may utilize both vectoring and halting can be handled by way of appropriate prioritization so that existing debug software and firmware can continue to be used without compromising debug capabilities.

Note that the above-described priority scheme for handling concurrent hardware debug events and software debug events ensures that the processor's behavior conforms to the expectation of a programmer who is programming the processor. The above-described priority scheme for handling concurrent hardware debug events and software debug events also ensures that the processor's behavior when halting for debug operation can be made to conform to the architectural definition of event boundaries for that particular architecture. As a result, this priority scheme may be used with a wide variety of processor architectures. In addition, the above-described priority scheme for handling concurrent hardware debug events and software debug events does not require changes to existing third party debug firmware. The above-described priority scheme for handling concurrent hardware debug events and software debug events may be implemented using a very small amount of circuitry, and thus the cost may be minimal. Alternate embodiments may have additional advantages and serve additional purposes.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

FIG. 1 illustrates a data processing system 10 consistent with one embodiment of the invention. Circuit 10 may be a system-on-chip. Data processing system 10 may be implemented on a single integrated circuit or on a plurality of integrated circuits. Data processing system 10 is just one possible apparatus that may comprise or make use of the present invention. A wide variety of other apparatus may comprise or make use of the present invention. In the illustrated embodiment, data processing system 10 includes processor 12, external debug circuitry 14, I/O (Input/Output) module 16, and memory 18, which may be bi-directionally coupled via bus or electrical conductors 20. In one embodiment, processor 12 and external debug circuitry 14 are coupled by way of bus or electrical conductors 21.

In alternate embodiments, memory 18 may be any type of memory or storage circuitry and may be located on the same integrated circuit as processor 12, or on a different integrated circuit than processor 12. In the illustrated embodiment, memory 18 may be any type of memory or combination of types of memory, such as, for example, read only memory (ROM), random access memory (RAM), non-volatile memory (e.g. Flash), etc. Also, for some embodiments, memory 18 may be a memory or other data storage located within another peripheral device or slave module. In one embodiment, I/O module 16 may be used to communicate to and/or from the external world beyond data processing system 10. In one embodiment, external debug circuitry 14 may be used for the purpose of debugging one or more portions of data processing system 10. In some embodiments, one or more of circuitry 12, 14, 16, and/or 18 may be coupled external to data processing system 10 for receiving and/or providing information. As one example, external debug circuitry 14 may be coupled external to data processing system 10 (e.g. by way of one or more integrated circuit terminals) in order to communicate with debugging hardware and software (not shown) that is located external to data processing system 10.

Figure 2:
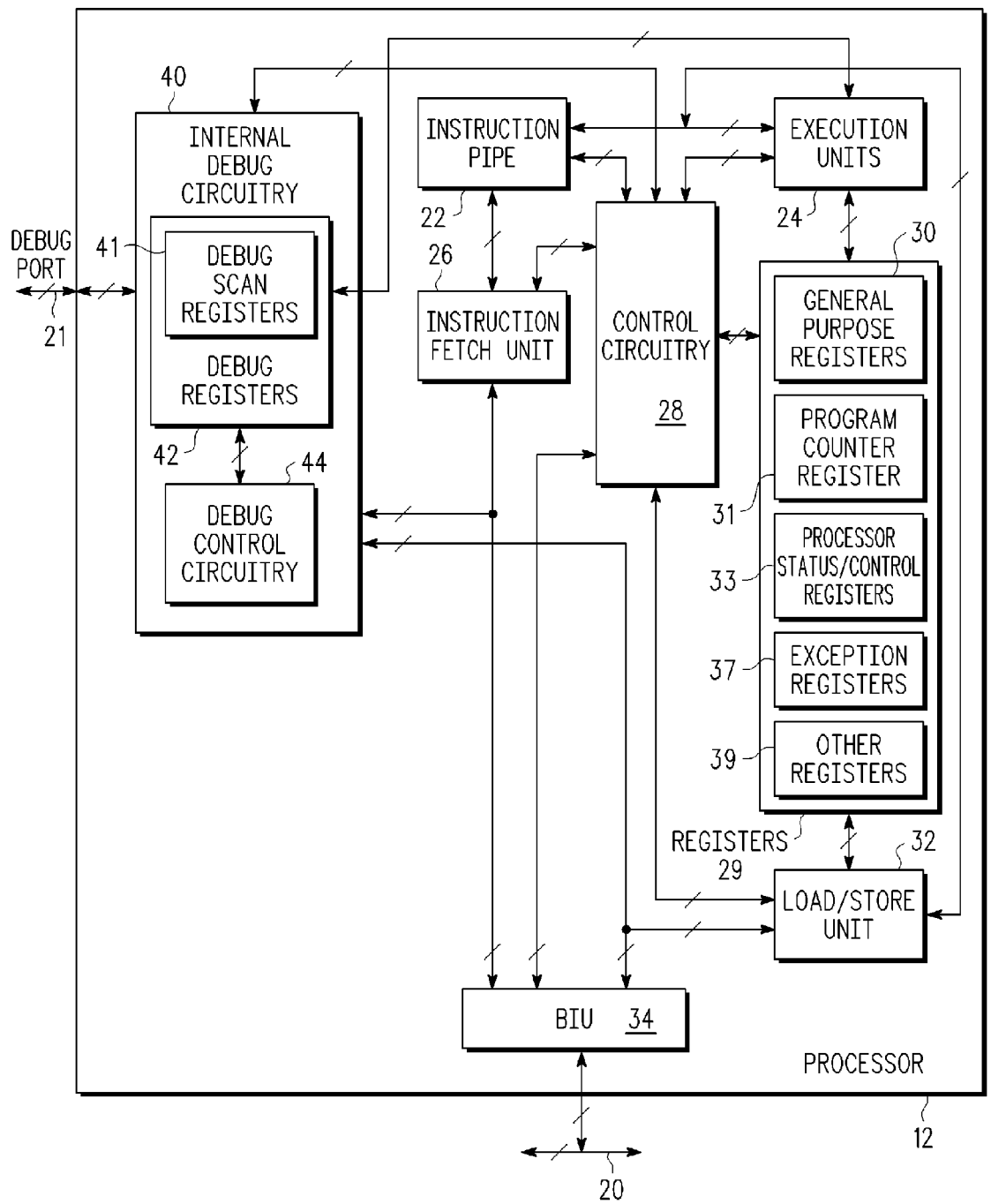
FIG. 2 illustrates, in block diagram form, a processor associated with the data processing system of FIG. 1 in accordance with one embodiment.

FIG. 2 illustrates, in block diagram form, a processor 12 associated with the data processing system 10 of FIG. 1 in accordance with one embodiment. In one embodiment, processor 12 may include an instruction pipe 22, one or more execution units 24, instruction fetch unit 26, control circuitry 28, one or more processor registers 29, load/store unit 32, bus interface unit (BIU) 34, and internal debug circuitry 40. In the illustrated embodiment, processor registers 29 comprise one or more general purpose registers 30, one or more program counter registers 31, one or more processor state/control registers 33, one or more exception registers 37, and one or more other registers 39. Alternate embodiments may comprise any desired types of registers having any desired function or functions in processor registers 29.

In one embodiment, processor 12 may communicate with other components of data processing system 10 via bus 20 coupled to BIU 34. Internal debug circuitry 40 may be coupled to external debugging circuitry (e.g. 14 of FIG. 1), such as an IEEE ISTO-5001 compliant Nexus™ debugging unit via a debug port 21. Nexus™ is a trademark of Freescale Semiconductor, Inc. located in Austin, Tex. In one embodiment, debug port 21 may be a serial interface, such as, for example, a JTAG compliant interface. Alternate embodiments may use any desired hardware and/or protocol for debug port 21.

In the embodiment of processor 12 illustrated in FIG. 2, control circuitry 28 is bi-directionally coupled to circuitry 22, 24, 26, 29, 32, 34, and 40; execution units 24 are bi-directionally coupled to circuitry 22, 28, 29, and 40; load/store unit 32 is bi-directionally coupled to circuitry 22, 24, 28, 29, 34, and 40; and BIU 34 is bi-directionally coupled to circuitry 26, 28, 32, and 40 [remove duplicate connections in FIG. 2 from 34 to 40]. Alternate embodiments of processor 12 may have more, fewer, or different circuit blocks than those illustrated in FIG. 2. In addition, alternate embodiments of processor 12 may couple the various circuit blocks or portions of circuitry in a similar or entirely different manner than that illustrated in FIG. 2. FIG. 2 is merely intended as one possible embodiment for processor 12. A wide variety of alternate embodiments of processor 12 may be used.

Still referring to FIG. 2, in one embodiment, internal debug circuitry 40 may include debug registers 42 which are bi-directionally coupled to debug control circuitry 44. In one embodiment, debug registers 42 may comprise one or more debug scan registers 41. Debug registers 42 also comprise one or more registers comprising bits grouped in fields for controlling various debug related events, including instruction breakpoints, data breakpoints, watchpoints, and other messaging associated with debugging. In some embodiments, these debugging resources (e.g. one or more portions of registers 42) may be simultaneously shared between processor 12 and external debug circuitry 14, such that a software debug event, i.e. a debug event intended to cause invocation of a software debug interrupt handler, may occur simultaneously with a hardware debug event, i.e. a debug event intended to cause the processor to cease instruction fetch and execution and then to enter a debug halted state. In alternate embodiments, the debugging resources shared between processor 12 and external debug circuitry 14 may comprise other types of circuitry in addition to or instead of debug registers 42. The sharing of debug resources allows for situations in which simultaneous hardware and software debug events may be synchronously generated, such as may be the case when execution of a given instruction causes both a software data breakpoint and a hardware data breakpoint. Many other combinations are possible for simultaneous synchronous debug events as well, and this one example is not intended to limit the applicability of the invention. By architectural definition or convention, boundary cases are associated with the handling of each possible debug event. For the case of a data breakpoint, the software debug interrupt handler should be invoked immediately after the instruction causing the breakpoint, without execution of further instructions, such that the data breakpoint may be handled in an appropriate manner as defined by the user of the data processing system. Similarly, for the case of a data breakpoint causing a hardware event, the processor boundary condition definition is to enter a debug halted state immediately after completion of the instruction which caused the hardware breakpoint event. It can be seen that the requirements of the software and hardware debug event conventions are in conflict, since the software convention is to begin execution of an interrupt handler, and the hardware convention is to stop immediately, such that the next instruction in sequence may be examined, singled-stepped, etc. If the hardware boundary convention is given priority, it is possible to lose the fact that a software interrupt handler must be invoked, or if it is invoked, the software boundary condition convention may likely be violated. Conversely, if the software convention is followed, then execution of any portion of the software debug interrupt handler will cause the boundary condition convention for the hardware debug mode to be violated. The current invention provides a means to resolve these seemingly incompatible requirements with a minimal cost.

FIG. 3 illustrates, in flow diagram form, an exemplary method or flow 100 for operating a processor (e.g. a processor as illustrated in FIG. 2) in a system (e.g. a data processing system 10 as in FIG. 1) in accordance with one embodiment. For one embodiment, the external debug circuitry 14, the internal debug circuitry 40, and the control circuitry 28 may be used to control execution of the method illustrated in FIG. 3. In one embodiment, flow 100 starts at block 102 with the step "receive enabled debug event(s)". Note that in order for the flow to proceed from step 102 in the illustrated embodiment, one or more received debug events need to be enabled. Alternate embodiments may operate in a different manner. The debug event(s) may be anything, such as, for example, breakpoints, watchpoints, etc.

From step 102, flow 100 proceeds to decision diamond 104 where the question is asked is the debug event a "hardware-only event?". If the answer at decision diamond 104 is NO, then either there was only one debug event and it was a software-only event, or there were both software and hardware debug events. In either case, the "NO" path from decision diamond 104 gives priority to software events and continues to block 106 where the step "discontinue instruction issue" is performed.

From step 106, flow 100 continues to block 108 where the step "reach selected instruction boundary" is performed. Alternate embodiments may select, define or determine the instruction boundary in many different ways. For example, the manner in which instruction boundaries are selected, defined or determined may be fixed (e.g. hardwired) or may be user selected. As one possible example of a user selected embodiment, one or more user-programmable register fields in debug registers 42 may be used to define how the instruction boundary is determined for various instructions. Note that for alternate embodiments, the instruction boundary may be selected, defined or determined in one manner for a first portion of instructions in the instruction set of processor 12, and may be determined in a different manner for a second portion of instructions in the instruction set of processor 12. Alternate embodiments may divide the instruction set of processor 12 into as many portions as desired for instruction boundary determination. Yet other circuitry and methods may be used to select, determine or define the instruction boundary.

From step 108, flow 100 continues to block 110 where the step "flush pipeline" is performed. In one embodiment, this step 110 will cause instruction pipe 22 of FIG. 2 to be flushed of instructions. Alternate embodiments may clear the pending instructions in a different manner. From step 110, flow 100 continues to block 112 where the step "save program counter (PC) register and processor status/control registers to exception registers" is performed. Referring to FIG. 2, in one embodiment, step 112 will cause one or more program counter registers 31 and one or more processor state/control registers 33 to be copied into exception registers 37. Alternate embodiments may save the state of processor 12 in a different manner (e.g. by saving different registers or information into different storage circuitry). From step 112, flow 100 continues to block 114 where the step "fetch first instruction of debug interrupt handler" is performed. In one embodiment, this step 114 will cause instruction fetch unit 26 of FIG. 2 to determine or be provided (e.g. by control circuit 28) the vector for the debug interrupt handler. Instruction fetch unit 26 then uses the vector for the debug interrupt handler to fetch the first instruction of the debug interrupt handler software routine. Alternate embodiments may fetch the first instruction of the debug interrupt handler software routine in a different manner.

From step 114, flow 100 continues to block 116 where the step "establish new PC and instruction register values" is performed. In one embodiment, this step 116 is performed by processor 12 executing software (e.g. one or more processor instructions) from the debug interrupt handler software routine. In the embodiment illustrated in FIGS. 2 and 3, the debug interrupt handler software routine stores new value in the program counter register 31 and in the instruction registers in instruction pipeline 22. Alternate embodiments may establish new instruction values in processor 12 in a different manner. From step 116, flow 100 proceeds to decision diamond 118 where the question is asked is the debug event a "software-only event?". If the answer at decision diamond 118 is NO, then there are both software and hardware debug events. For some embodiments, the hardware debug event was received at step 102 along with the software debug event. For alternate embodiments, the software debug event was received at step 102 and the hardware debug event was received any time before decision diamond 118. In either case, the "NO" path from decision diamond 118 proceeds to block 124 and indicates that simultaneous or concurrent or overlapping hardware and software debug events have occurred, and that priority or control of processor 12 is transferred from the software debug event to the hardware debug event.

Returning back to decision diamond 104, if the answer at decision diamond 104 is YES, then there was a hardware debug event and no software debug event. As a result, flow 100 proceeds to block 120 where the step "discontinue instruction issue" is performed. In one embodiment of processor 12 illustrated in FIG. 2, step 120 may be performed by control circuitry 28 halting or stopping instruction pipe 22 so that no further instructions are issued from instruction pipe 22 to execution units 24.

From step 120, flow 100 continues to block 122 where the step "reach selected instruction boundary" is performed. Alternate embodiments may select, define or determine the instruction boundary in many different ways. For example, the manner in which instruction boundaries are selected, defined or determined may be fixed (e.g. hardwired) or may be user selected. As one possible example of a user selected embodiment, one or more user-programmable register fields in debug registers 42 may be used to define how the instruction boundary is determined for various instructions. Note that for alternate embodiments, the instruction boundary may be selected, defined or determined in one manner for a first portion of instructions in the instruction set of processor 12, and may be determined in a different manner for a second portion of instructions in the instruction set of processor 12. Alternate embodiments may divide the instruction set of processor 12 into as many portions as desired for instruction boundary determination. Yet other circuitry and methods may be used to select, determine or define the one or more instruction boundaries.

From step 122, flow 100 continues to block 124 where the step "preserve internal state in debug scan registers" is performed. Referring to FIG. 2, in one embodiment, step 124 will cause one or more of registers 30, 31, 33, 37, and/or 39 to be copied into debug scan registers 41. Alternate embodiments may save the state of processor 12 in a different manner (e.g. by saving different registers or information into different storage circuitry). From step 124, flow 100 continues to block 126 where the step "enter debug-halted state" is performed. Referring to FIG. 2, in one embodiment, step 126 will cause control circuitry 28 and debug control circuitry 44 to place processor 12 into a debug-halted state. Note that each of control circuitry 28 and/or debug control circuitry 44 may be implemented as one or more state machines, as combinational logic, or as any type of circuitry that performs the steps illustrated in flow 100 or alternate embodiments of flow 100. From step 126, flow 100 continues to block 128 where the step "await debugger commands provided through debug port" is performed. Referring to FIG. 2, in one embodiment, the debugger commands and the debug port 21 may be compliant with the Nexus™ standard and/or with the JTAG standard. Alternate embodiments may use debugger commands and/or a debug port that is compliant with one or more different standards or with no standard.

From step 128, flow 100 continues to block 130 where the step "perform hardware debug commands" is performed. Referring to FIG. 2, in one embodiment, the debugger hardware commands are received via debug port 21 and are executed by the internal debug circuitry. In one embodiment, these debugger hardware commands may be compliant with the Nexus™ standard and/or with the JTAG standard. Alternate embodiments may use debugger commands and/or a debug port that is compliant with one or more different standards or with no standard. Note that for one embodiment of the processor 12 illustrated in FIG. 2, the debugger commands for handling the hardware debug event are received via the debug port 21, are Nexus™ compliant commands, and are executed under the direction of the debug control circuitry 44; on the other hand, the debug interrupt handler instructions are received via bus 20 and BIU 34, are processor 12 instructions, and are executed under the direction of the processor control circuitry 28.

From step 130, flow 100 proceeds to block 131 where the step "exit hardware debug mode" is performed. From step 131, flow 100 proceeds to decision diamond 132 where the question is asked is the debug event a "hardware-only event?". If the answer at decision diamond 132 is NO, then there is a software event still pending and flow 100 proceeds to block 134 where the step "execute debug interrupt handler" is performed. From step 134, flow 100 proceeds to block 136 where normal execution of instructions by processor 12 is resumed. If the answer at decision diamond 132 is YES, then there are no software events still pending that need to be handled and flow 100 also proceeds to block 136 where processor 12 resumes normal operation.

By now it should be appreciated that there has been provided a method and apparatus for effectively and cost-efficiently handling one or more debug events generated by either or both hardware-owned and/or software-owned resources, and for resolving the issue of handling of these events in conformity with established boundary conditions for each type of event.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. For example, memory 18 may be located on a same integrated circuit as masters 12 and I/O circuitry 16 or on a separate integrated circuit or located within another peripheral or slave discretely separate from other elements of system 10. Memory 18 and I/O circuitry 16 may also be located on separate integrated circuits or devices. Also for example, system 10 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, the circuitry illustrated in the embodiments of FIG. 1 and FIG. 2 may be replaced by any circuitry that implements the present invention. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Additional Text

1. A method for example: (100), comprising:
    determining whether a software debug event is pending for example (104);
    determining whether a hardware debug event is pending for example (104);
    when the software debug event is being handled, fetching a first instruction of a software debug program for example (114);
    when the software debug event is being handled, executing the first instruction of the software debug program for example (134);
    after said step of fetching the first instruction of the software debug program and before said step of executing the first instruction of the software debug program, handling the hardware debug event when the hardware debug event is pending for example (124, 126, 128, 130, 131); and
    after said step of handling the hardware debug event, completing execution of the software debug program for example (134).
2. A method as in statement 1, further comprising:
    when the software debug event is being handled, discontinuing instruction issue for example (106);
    when the software debug event is being handled, proceeding to an instruction boundary for example (108); and
    when the software debug event is being handled, flushing an instruction pipeline for example (110).
3. A method as in statement 2, further comprising:
    selecting the instruction boundary for example (108).
4. A method as in statement 3, wherein selecting the instruction boundary comprises programming a register for example (108).
5. A method as in statement 1, further comprising:
    when the software debug event is being handled, saving contents of a program counter for example (112).
6. A method as in statement 1, wherein said step of handling the hardware debug event comprises:
    preserving state information for example (124);
    entering a hardware debug mode for example (126);
    receiving one or more hardware debug commands via a debug port for example (128);
    performing the one or more hardware debug commands for example (130); and
    exiting the hardware debug mode for example (131).
7. A method as in statement 6, wherein said step of entering a hardware debug mode comprises halting a processor for example (126).
8. An apparatus for example (10, 12), comprising:
    a first debug resource for example (a first one of debug registers 42) for causing a software debug event;
    a second debug resource for example (a second one of debug registers 42) for causing a hardware debug event; and
    circuitry for example (40, 28) for detecting if the software debug event has occurred and for detecting if the hardware debug event has occurred, said circuitry initially giving priority to the software debug event if both the software debug event and the hardware debug event have occurred, said circuitry beginning handling of the software debug event, said circuitry transferring priority from the software debug event to the hardware debug event before completing handling of the software debug event, said circuitry completing handling of the hardware debug event before completing handling of the software debug event.
9. An apparatus as in statement 8, wherein the first debug resource comprises a first debug register for example (42), and wherein the second debug resource comprises a second debug register for example (42).
10. An apparatus as in statement 8, further comprising:
    an instruction pipe for example (22),
    wherein the instruction pipe is flushed during handling of the software debug event.
11. An apparatus as in statement 8, further comprising:
    a program counter register for example (31),
    wherein a first value of the program counter register is saved in storage circuitry for example (37), and wherein a second value is stored in the program counter register, wherein the first value of the program counter is used during normal operation and wherein the second value is used during handling of the software debug event.
12. An apparatus as in statement 11, wherein the storage circuitry used to save the first value of the program counter register comprises an exception register for example (37).
13. An apparatus as in statement 8, further comprising:
    instruction fetch circuitry for example (26) for fetching one or more instructions used during handling of the software debug event.

14. An apparatus for example (10, 12), comprising:
   circuitry for example (40, 28, 102) for detecting if a software debug event has occurred and for detecting if a hardware debug event has occurred;
   circuitry for example (40, 28, 104) for initially giving priority to the software debug event if both the software debug event and the hardware debug event have occurred;
   circuitry for example (40, 28, 106, 108, 110, 112, 114, 116) for beginning handling of the software debug event;
   circuitry for example (40, 28, 118) for transferring priority from the software debug event to the hardware debug event before completing handling of the software debug event; and
   circuitry for example (40, 28, 124, 126, 128, 130, 131, 132) for completing handling of the hardware debug event before completing handling of the software debug event.

15. An apparatus as in statement 14, wherein the circuitry for example (40, 28, 118) for transferring priority from the software debug event to the hardware debug event before completing handling of the software debug event comprises a state machine.

16. An apparatus as in statement 15, wherein the circuitry for example (40, 28, 104) for initially giving priority to the software debug event if both the software debug event and the hardware debug event have occurred comprises said state machine.

17. An apparatus as in statement 14, further comprising a processor for example (12).

18. An apparatus as in statement 17, wherein the processor comprises a program counter register for example (31).

19. An apparatus as in statement 18, wherein the processor further comprises an exception register for example (37) for storing contents of the program counter register during handling of the software debug event.

20. An apparatus as in statement 14, wherein the apparatus is formed on an integrated circuit.

What is claimed is:

1. A method, comprising:
   determining that a software debug event is pending, wherein the software debug event is an event that causes invocation of a software debug interrupt handler to handle the software debug event;
   determining that a hardware debug event is pending at a same time that the software debug event is pending, wherein the hardware debug event is an event that causes a processor to cease fetching and executing instructions and to enter a debug halted state;
   determining that the pending software debug event initially has priority over the pending hardware debug event;
   when the software debug event is being handled, fetching a first instruction of the software debug interrupt handler;
   when the software debug event is being handled, executing the first instruction of the software debug interrupt handler;
   after said step of fetching the first instruction of the software debug interrupt handler and before said step of executing the first instruction of the software debug interrupt handler, switching priority to the hardware debug event;
   handling the hardware debug event between the steps of fetching the first instruction and executing the first instruction; and
   after said step of handling the hardware debug event, resuming execution of the software debug interrupt handler for handling of the software debug event.

2. A method as in claim 1, further comprising:
   when the software debug event is being handled, discontinuing instruction issue;
   when the software debug event is being handled, proceeding to an instruction boundary; and
   when the software debug event is being handled, flushing an instruction pipeline.

3. A method as in claim 2, further comprising:
   selecting the instruction boundary.

4. A method as in claim 3, wherein selecting the instruction boundary comprises programming a register.

5. A method as in claim 1, further comprising:
   when the software debug event is being handled, saving contents of a program counter.

6. A method as in claim 1, wherein said step of handling the hardware debug event comprises:
   preserving state information;
   entering a hardware debug mode;
   receiving one or more hardware debug commands via a debug port;
   performing the one or more hardware debug commands; and
   exiting the hardware debug mode.

7. A method as in claim 6, wherein said step of entering a hardware debug mode comprises halting the processor.

8. An apparatus, comprising:
   a first debug resource for causing a software debug event, the software debug event for causing invocation of a software debug interrupt handler to handle the software debug event;
   a second debug resource for causing a hardware debug event, the hardware debug event for causing a processor to cease fetching and executing instructions and to enter a debug halted state; and
   circuitry for detecting if the software debug event has occurred and for detecting if the hardware debug event has occurred, said circuitry initially giving priority to the software debug event if both the software debug event and the hardware debug event are pending at a same time, said circuitry beginning handling of the software debug event, said circuitry transferring priority from the software debug event to the hardware debug event after fetching a first instruction for handling the software debug event and before executing the first instruction for handling the software debug event, said circuitry completing handling of the hardware debug event before completing handling of the software debug event.

9. An apparatus as in claim 8, wherein the first debug resource comprises a first debug register, and wherein the second debug resource comprises a second debug register.

10. An apparatus as in claim 8, further comprising:
    an instruction pipe,
    wherein the instruction pipe is flushed during handling of the software debug event.

11. An apparatus as in claim 8, further comprising:
    a program counter register,
    wherein a first value of the program counter register is saved in storage circuitry, and wherein a second value is stored in the program counter register,
    wherein the first value of the program counter is used during normal operation and wherein the second value is used during handling of the software debug event.

12. An apparatus as in claim 11, wherein the storage circuitry used to save the first value of the program counter register comprises an exception register.

13. An apparatus as in claim 8, further comprising:
instruction fetch circuitry for fetching one or more instructions used during handling of the software debug event.

14. An apparatus, comprising:
circuitry for detecting that a software debug event has occurred and for detecting that a hardware debug event has occurred, wherein the software debug event and the hardware debug event are synchronously generated and pending at a same time in response to a processor executing an instruction;
circuitry for initially giving priority to the software debug event;
circuitry for beginning handling of the software debug event;
circuitry for stopping handling of the software debug event and for transferring priority from the software debug event to the hardware debug event after a first instruction for handling the software debug event has been fetched and before the first instruction is executed; and
circuitry for completing handling of the hardware debug event, wherein the first instruction for handling of the software debug event is executed after the handling of the hardware debug event is completed.

15. An apparatus as in claim 14, wherein the circuitry for transferring priority from the software debug event to the hardware debug event before completing handling of the software debug event comprises a state machine.

16. An apparatus as in claim 15, wherein the circuitry for initially giving priority to the software debug event if both the software debug event and the hardware debug event have occurred comprises said state machine.

17. An apparatus as in claim 14, wherein the processor further comprises a program counter for storing a program counter value corresponding to the first instruction before priority is transferred to the circuitry for completing handling of the debug event.

18. An apparatus as in claim 14, wherein the processor comprises a register for storing an interrupt processing vector, the interrupt processing vector for pointing to a point at which processing is halted after the first instruction is fetched.

19. An apparatus as in claim 14, wherein the first instruction for the handling of the software debug event is executed after the handling of the hardware debug event is completed and prior to execution of any other instruction after the handling of the hardware debug event is completed.

20. An apparatus as in claim 14, wherein the apparatus is formed on an integrated circuit.

\* \* \* \* \*